(12) United States Patent
Pierre

(10) Patent No.: US 9,836,910 B1
(45) Date of Patent: Dec. 5, 2017

(54) VEND-A-SHU SYSTEMS

(71) Applicant: Erica Pierre, Aurora, IL (US)

(72) Inventor: Erica Pierre, Aurora, IL (US)

( * ) Notice: Subject to any disclaimer, the term of this patent is extended or adjusted under 35 U.S.C. 154(b) by 0 days.

(21) Appl. No.: 14/541,476

(22) Filed: Nov. 14, 2014

Related U.S. Application Data

(60) Provisional application No. 61/904,121, filed on Nov. 14, 2013.

(51) Int. Cl.
*G07F 9/02* (2006.01)
*A47F 5/00* (2006.01)
*A47B 88/04* (2006.01)

(52) U.S. Cl.
CPC .............. *G07F 9/023* (2013.01); *A47B 88/04* (2013.01); *A47F 5/0025* (2013.01)

(58) Field of Classification Search
CPC combination set(s) only.
See application file for complete search history.

(56) References Cited

U.S. PATENT DOCUMENTS

| | | | |
|---|---|---|---|
| D580,172 S | 11/2008 | Perez | |
| D584,053 S | 1/2009 | Abdo et al. | |
| 8,567,615 B1 | 10/2013 | Rainey | |
| 2001/0045440 A1* | 11/2001 | Nelson | B25H 3/04 224/563 |
| 2003/0222618 A1* | 12/2003 | Kanouda | G06F 1/30 320/116 |
| 2005/0067420 A1* | 3/2005 | Diaz | A43D 117/00 221/2 |
| 2008/0009560 A1* | 1/2008 | McKay, Jr. | A61L 9/042 523/102 |
| 2012/0126958 A1* | 5/2012 | Kim | A61J 7/0481 340/309.7 |
| 2013/0051959 A1* | 2/2013 | Alghamdi | A47B 61/04 414/273 |

* cited by examiner

*Primary Examiner* — Gene Crawford
*Assistant Examiner* — Stephen Akridge
(74) *Attorney, Agent, or Firm* — Steven H. Greenfield; Greenfield Invention and Patent Consulting, Inc.

(57) ABSTRACT

A line of intricate, home-based vending machines specially designed for housing and organizing a multitude of shoes and boots. Design intent of this product is to provide a more convenient, as well as accessible, means of storing, maintaining, and accessing footwear, particularly in residences where storage space is limited.

13 Claims, 5 Drawing Sheets

VEND-A-SHU SYSTEMS

CROSS-REFERENCE TO RELATED APPLICATION

The present application is related to and claims priority from prior provisional application Ser. No. 61/904,121, filed Nov. 14, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of vending and storage and more specifically relates to a Vend-A-Shu system.

2. Description of the Related Art

Many people live in residences in modern society. Housing may be limited and expensive. Those who reside in small, compact living spaces, such as dorm rooms, studio apartments, and mobile homes, readily attest that the main advantage of less space is that there is less area to clean. However, it also has its downside when it comes to decorating and especially storage. Studio apartments and college dorms pose a particular problem due to the fact that all household functions may be limited to one room (i.e., eating, entertaining, sleeping, and studying). When working with any compact living area, many consumers incorporate multifunctional furnishings to optimize usable space. Yet, there is little one can do to increase the amount of space available for clothing and sundry personal items. As such, small closets tend to be filled with hanging clothes as well as foldable garments and other items for which there is no room to display.

This problem is particularly exacerbated when one owns multiple pairs of shoes. From stylish pumps and flats to compliment evening wear and casual sandals and flip flops for recreation, to steel-toed boots for work and specialized sneakers for workout routines, it is not uncommon for one individual to own several pairs of each variety. As such, these consumers have no choice but to line floor space with shoes, or to pile them one pair on top of the other in cramped closets and drawers. As a result, one is either tripping over shoes or digging through stacks of footwear to find the pair needed. Frustrating and time consuming, the travails of shoe storage and organization typically leave consumers exhausted and annoyed before they are able to don the chosen shoes. This is not desirable.

Various attempts have been made to solve the above-mentioned problems such as those found in U.S. Pat. No. 8,567,615 to Sheila O. Rainey; U.S. Design Pat. No. D580,172 to Jose A. Perez; and U.S. Design Pat. No. D584,053 to Frederick Abdo et al. This art is representative of vending and storage means for shoes. None of the above inventions and patents, taken either singly or in combination, is seen to describe the invention as claimed.

Ideally, a Vend-A-Shu system (footwear vending system) should provide efficient and convenient vending of footwear and, yet would operate reliably and be manufactured at a modest expense. Thus, a need exists for a reliable footwear vending system to avoid the above-mentioned problems.

BRIEF SUMMARY OF THE INVENTION

In view of the foregoing disadvantages inherent in the known vending and storage art, the present invention provides a novel footwear vending system entitled 'Vend-A-Shu system'. The general purpose of the present invention, which will be described subsequently in greater detail is to provide an efficient and convenient means for storing, maintaining, and accessing footwear of footwear. The present invention comprises a novel line of intricate, home-based vending machines specially designed for housing and organizing a multitude of shoes and boots. Design intent of this product is to provide a more convenient, as well as accessible, means of storing, maintaining, and accessing footwear, particularly in residences where storage space is limited.

A footwear vending system is disclosed herein, in a preferred embodiment, comprising: a footwear vending assembly comprising a housing having a shell (having an outer surface, and an inner volume with a plurality of receiver slots), and a plurality of removable footwear drawers with front-mounted illuminator means, a cpu, a modem, a camera, a display screen, and a breathable cover comprising horizontally-stacked sock pockets; wherein the footwear vending system comprises the footwear vending assembly, the cpu, the modem, the camera, and the display screen in functional combination.

The footwear vending assembly comprises the housing having the shell and the plurality of removable footwear drawers; wherein each of the plurality of removable footwear drawers is able to be removably received by each corresponding receiver slot of the plurality of receiver slots. Preferably the removable footwear drawers each comprise at least one vent. Further, the removable footwear drawers each preferably comprise a handle; wherein each handle comprises the at least one vent, preferably under the handle such that stored contents do not get musty from lack of ambient airflow. The breathable cover comprising horizontally-stacked sock pockets is able to envelope the footwear vending assembly, yet allows objects stored within to breathe. The shell of the housing is defined by the outer surface and the inner volume; the inner volume divided into the plurality of receiver slots; wherein the plurality of receiver slots are structured and arranged to receive the removable footwear drawers; the removable footwear drawers each for removably storing at least one footwear item.

The at least one footwear item as discussed herein may comprise shoes and alternately boots or other such footwear. The removable footwear drawers are preferably transparent such that a picture-label indicating which particular at least one footwear item(s) are stored therein is able to be viewed (the footwear may also be viewed).

The cpu is in communication with the display screen, and the modem, such that pictures taken of the at least one footwear item, via the camera, are able to be uploaded to an internet for remote access; wherein the display screen displays the at least one footwear item(s) in relation to relative placement within the housing. The cpu is able to be searched via an inputter using boolean logic; wherein the inputter may comprise a touchscreen, a keyboard, mouse or the like. The illuminator means is used to visually indicate where a selected at least one footwear item(s) is located in relation to the housing; the illuminator means activated to an on-condition on a corresponding the removable footwear drawer storing the selected the at least one footwear item(s), and an off-condition during non-use (non-selected conditions). The cpu stores and relays information related to the at least one footwear item(s) stored in each of the removable footwear drawers such that a user is able to view via the screen display; the at least one footwear item(s) such that the user is able to expediently locate a desired the at least one footwear item to accessorize an outfit for wear.

A kit is described including: the footwear vending assembly, the breathable cover, the cpu, the modem, the camera, and a set of user-instructions.

A method of using a footwear vending system is also disclosed herein comprising the steps of: activating a cpu of the footwear vending system, taking at least one picture of at least one footwear item, entering a description via searchable keywords associating a particular the at least one footwear item and the at least one picture to a corresponding removable footwear drawers, printing a label and installing it on selected the removable footwear drawer, and uploading the description(s) and the at least one picture to an internet for remote access. The method may further comprise the steps of selecting a desired at least one footwear item, as viewed, and removing the selected at least one footwear item for wear.

The present invention holds significant improvements and serves as a Vend-A-Shu system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, Vend-A-Shu system, constructed and operative according to the teachings of the present invention.

The various embodiments of the present invention will hereinafter be described in conjunction with the appended drawings, wherein like designations denote like elements.

DETAILED DESCRIPTION

Figure 1:
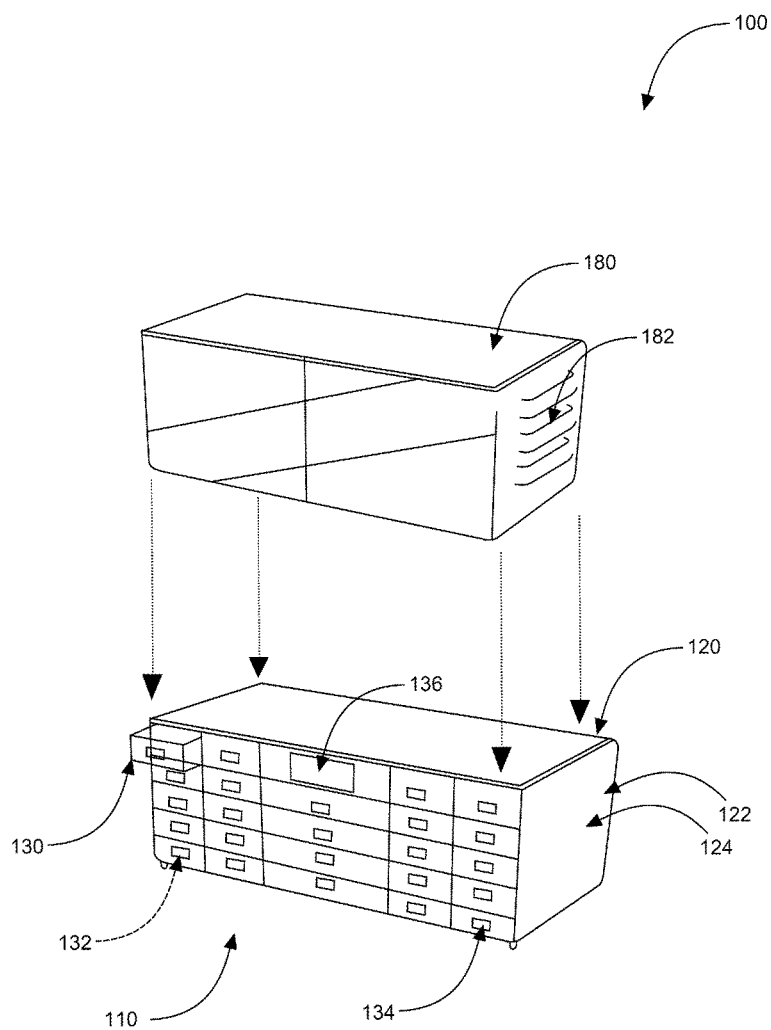
FIG. 1 shows a perspective view illustrating a Vend-A-Shu system according to an embodiment of the present invention.
Figure 2:
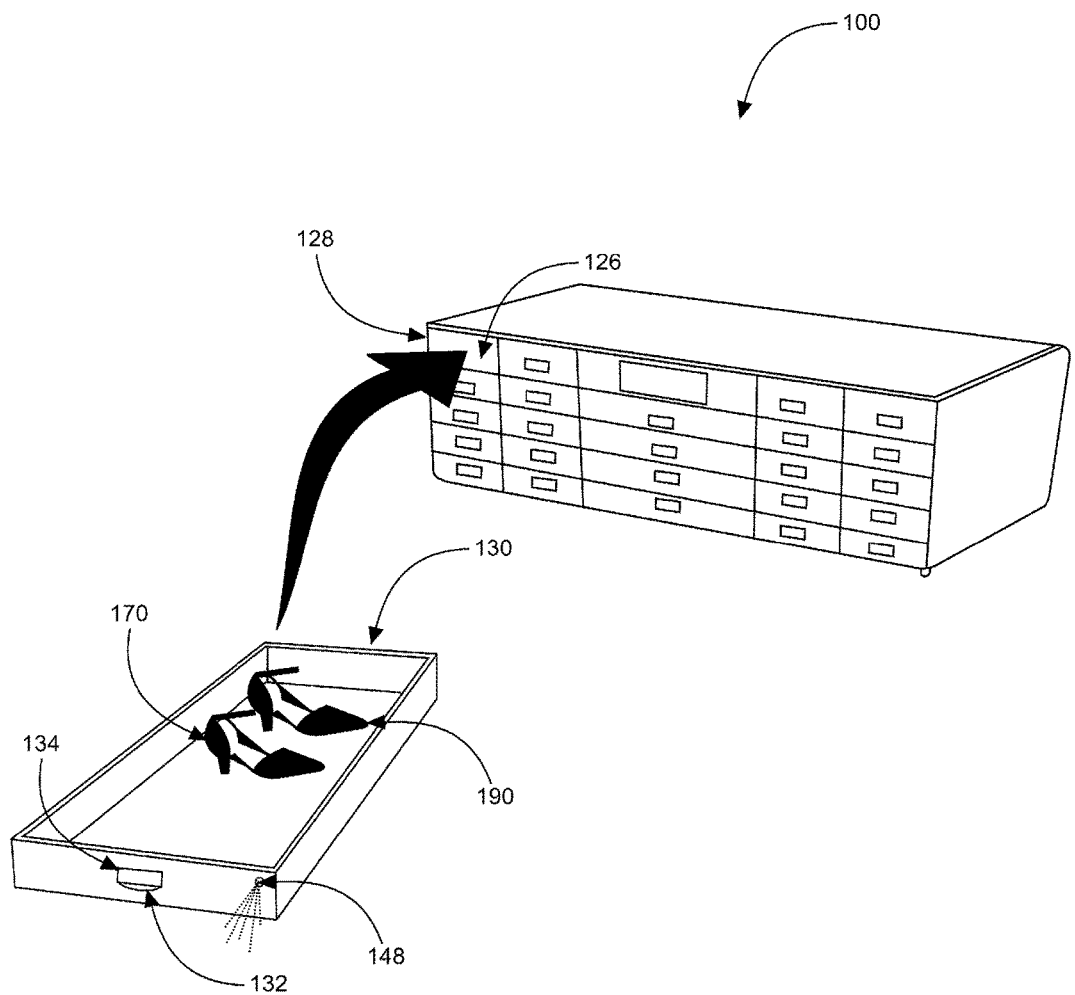
FIG. 2 is a perspective view illustrating a Vend-A-Shu assembly according to an embodiment of the present invention of FIG. 1.
Figure 3:
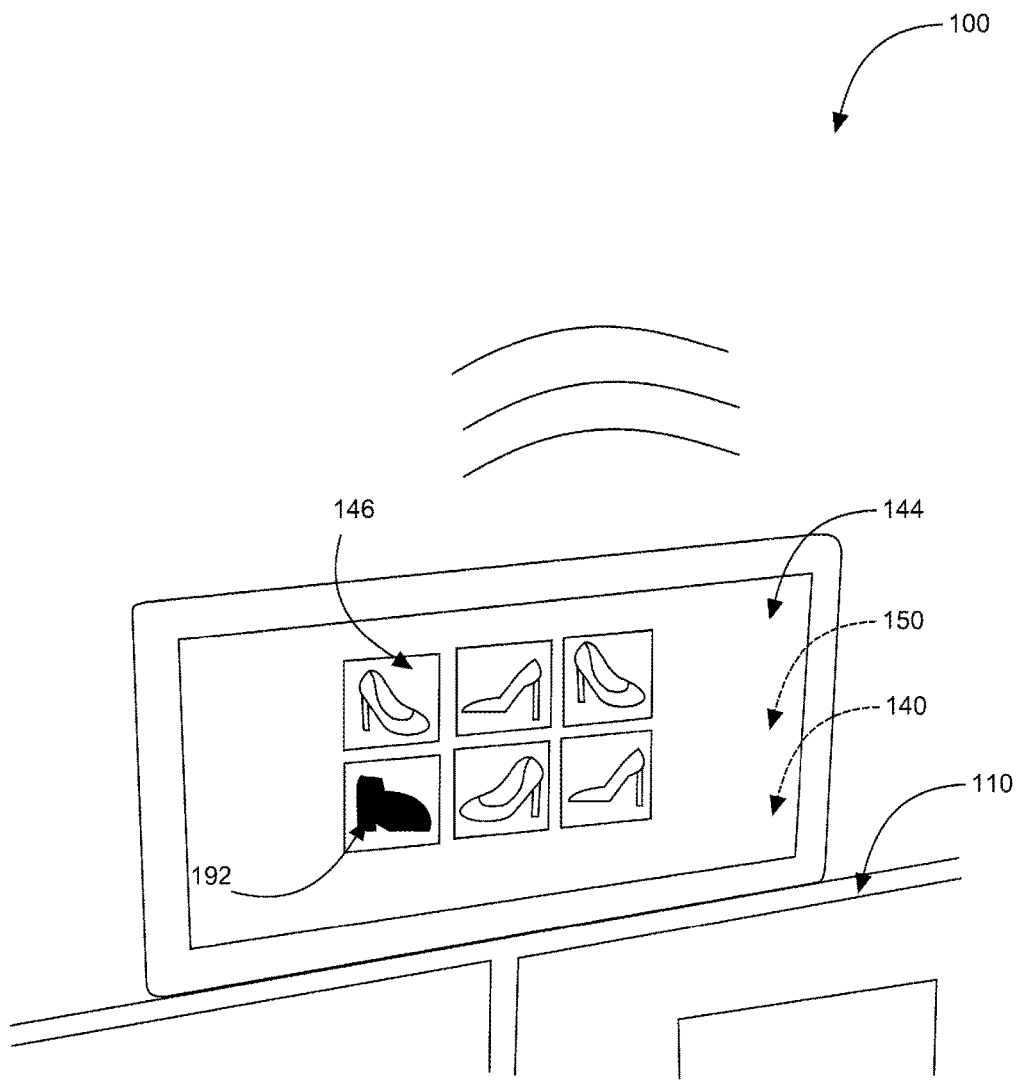
FIG. 3 is a perspective view illustrating the Vend-A-Shu assembly according to an embodiment of the present invention of FIG. 1.
Figure 4:
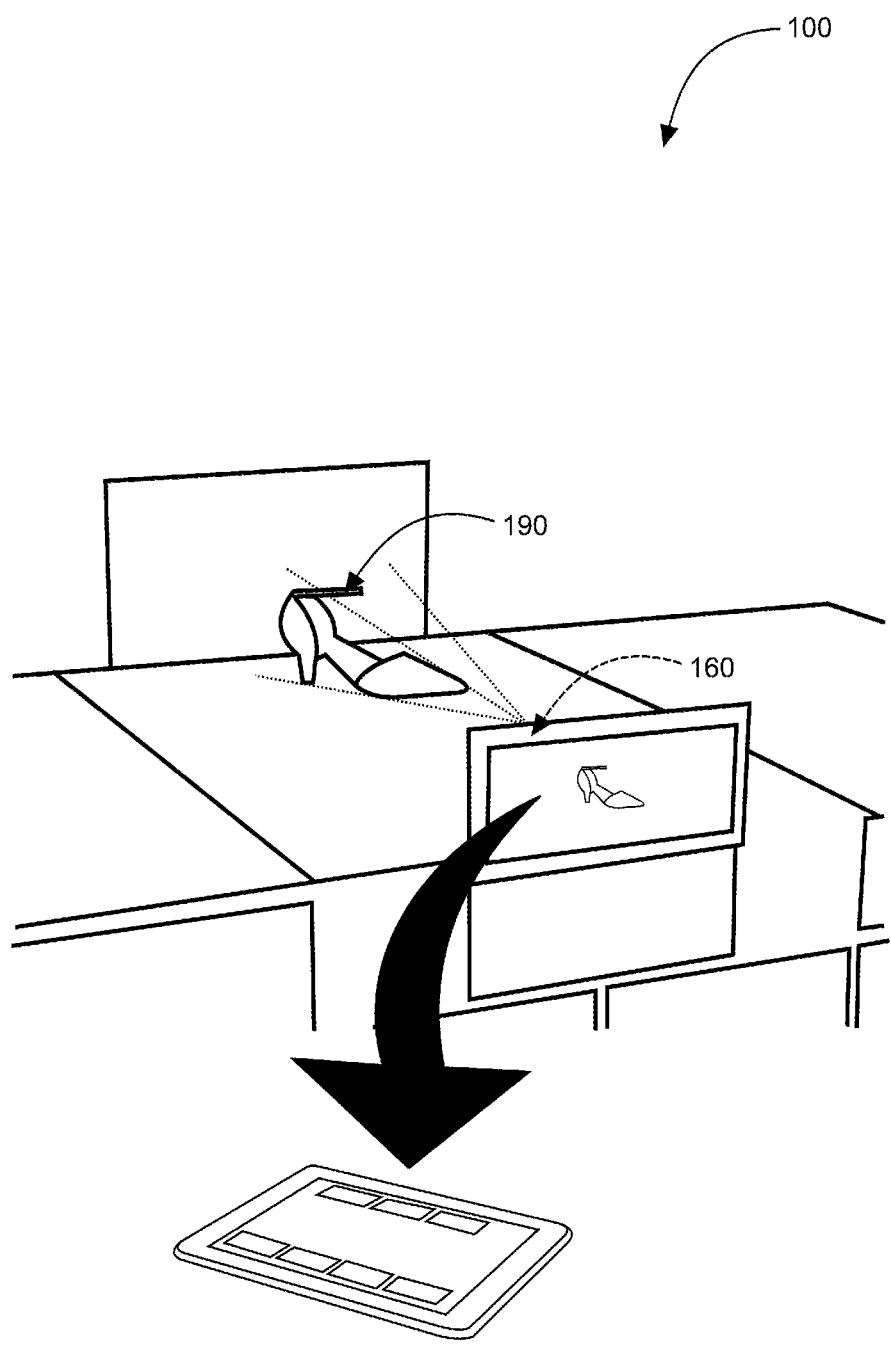
FIG. 4 is a perspective view illustrating components of the Vend-A-Shu assembly according to an embodiment of the present invention of FIG. 1.

As discussed above, embodiments of the present invention relate to a vending and storage means for shoes and more particularly to a Vend-A-Shu system (footwear vending system) as used to improve the efficiency of shoe storage within a limited footprint.

Generally speaking, the Vend-A-Shu comprises a line of intricate, home-based vending machines specially designed for housing and organizing a multitude of shoes and boots. The Vend-A-Shu may essentially be constructed in a manner similar to vending machines accorded for food and drink, with multiple compartments conveniently labeled to securely house designated footwear, which may be selected via a specially configured computer system with companion program developed specifically for the Vend-A-Shu. The housing itself, or a "portable closet on wheels," may be offered in sections that are rectangular in shape. Measuring approximately sixty-four inches (64") in height, twenty-four inches (24") in width, and sixteen inches (16") in depth, each vertical sub-section may be joined with additional sub-sections to form a matrix of up to five (5) units.

This versatile construction may take into account space limitations, as well as availability, accorded to each consumer, so that the Vend-A-Shu can be customized to individual needs. Divided into compartments or cubby holes that are rectangular and box-like in shape, the Vend-A-Shu storage capabilities may house two (2) pairs of shoes or one (1) pair of boots in each box, extending to a grand total of 58 pairs of shoes (29 boots) for the entire system.

The Vend-A-Shu system may be initially set up via the provided computer and accompanying software. After selecting the shoes and/or boots (hereafter simply referred to as "shoes" or "footwear") to be stored within the system, the user may employ a camera, or "Photo Studio," incorporated into the computer to snap a digital picture of the footwear. A removable cubby or storage cell within the Vend-A-Shu machine is then selected by the user and assigned to a certain pair of shoes; this cell is then given a designation according to location in row/column format (for example, A-1, B-3, C-4, etc.). The computer may then produce a picture label of the footwear, which is then affixed to the end of the box facing outward, so that it is easily seen. The shoes are placed in the chosen cell, and the same procedure is used to program the system for storage and organization until complete, with the user assigning descriptive values to each pair of footwear and inputting this information into the Vend-A-Shu computer.

These values may include, but are not limited to, color, heel height, maker, and material type, just to name a few. The above procedure may facilitate easy and accurate accessibility when a user is searching for a particular pair of shoes. As such, the Vend-A-Shu computer may be able to "weed out" unwanted footwear when a user inputs search parameters. Using an example provided by the inventor, a user wishes to wear a pair of black heels with the toe out. In the Vend-A-Shu computer, she may input the (keyword strings) terms "Shoes," "Black," "Heels/Pumps," and "Toe Out." In the manner of an online search engine, the computer may then display the photos of all of the shoes matching the above descriptors. Gazing at the pictures, the user may then touch the computer screen to select her preferred pair; as a result, the cell containing the shoes may light, and the chosen footwear vended to the consumer. When it is time to replace the shoes back into the Vend-A-Shu unit, all of the empty cells may be displayed on the computer screen, including the cell (receiver slots) from which the shoes were originally housed. Selecting that cell on the computer screen, the empty receptacle pops out, and the user is able to replace the footwear in the proper housing.

There are many significant benefits and advantages associated with the Vend-A-Shu. Foremost, this product line may provide a technologically advanced, though simple and effective means of maximizing and optimizing shoe storage and organization, regardless of the size of one's living space. A creatively designed line of wheeled, computer-controlled vending machines with storage boxes featuring automated components, the Vend-A-Shu may allow users to sufficiently house a plethora of footwear. As a result, floor spaces may not be littered with shoes scattered hither and yon, a very real tripping hazard. With just a few simple keystrokes on the Vend-A-Shu computer, users may be able to easily and expediently retrieve a needed pair of shoes, in just a matter of seconds. Certain non-manual embodiments may comprise a remote control.

In this manner, consumers may not have to worry about a digging through stacks of heavy shoes or about footwear falling on top of them. Consumers should appreciate that by using Vend-A-Shu, the problem of having limited shoe storage space within the home may be effectively eliminated. Moreover, the protective compartments may help keep costly shoes in pristine condition, alleviating the risk of scuffs that can result from loose footwear. Customizable to one's living spaces, this unique and practical storage system may prove especially beneficial to those living in college dormitories, studio apartments, mobile homes, assisted living facilities, or anywhere else that space is extremely limited and storage is a must. Yet, anyone with multiple shoes may benefit from this product, even if they possess entire closets that may be devoted to just shoes. Manufactured of durable, high quality materials and components easily adaptable to changing technology, the Vend-A-Shu should withstand years of continued use.

Referring to the drawings by numerals of reference there is shown in FIGS. 1-4, various views of footwear vending system 100.

Footwear vending system 100 comprises: footwear vending assembly 110 comprising housing 120 having shell 122 having outer surface 124, and inner volume 126 with a plurality of receiver slots 128, a plurality of removable footwear drawers 130, cpu 140, modem 150, and camera 160; wherein footwear vending system 100 comprises at least footwear vending assembly 110, cpu 140, modem 150, and camera 160 in functional combination.

Footwear vending assembly 110 comprises housing 120 having shell 122 and the plurality of removable footwear drawers 130, as shown in FIGS. 1-4. Each of the plurality of removable footwear drawers 130 is able to be removably received by each corresponding receiver slot of the plurality of receiver slots 128. Shell 122 of housing 120 is defined by outer surface 124 and inner volume 126; inner volume 126 is divided into the plurality of receiver slots 128. The plurality of receiver slots 128 are structured and arranged to receive removable footwear drawers 130; removable footwear drawers 130 each for removably storing at least one footwear item 170 in a protected condition. Removable footwear drawers 130 preferable slide in relation to receiver slots 128 such that at least one footwear item 170 can be accessed at will.

Footwear vending assembly 110 may be operated via manual or non-manual means. Non-manual means may comprise for example chains and gears and electrical motors for manipulating removable footwear drawers 130 in relation to housing 120. Those with ordinary skill in the art will now appreciate that upon reading this specification and by their understanding the art of manual and non-manual manipulation means as described herein, methods of manipulation via suitable mechanical, electrical, hydraulic, pneumatic systems, and the like will be understood by those knowledgeable in such art.

Cpu 140 is in communication with modem 150, such that pictures taken of footwear item(s) 170, via camera 160, are able to be uploaded to an internet for remote access. Cpu 140 stores and relays information related to at least one footwear item 170 stored in each of removable footwear drawers 130 such that a user is able to view via a display, the at least one footwear item(s) 170 such that the user is able to expediently locate a desired at least one footwear item 170 to accessorize an outfit for wear.

In preferred embodiments removable footwear drawers 130 each comprise at least one vent 132; wherein removable footwear drawers 130 each comprise handle 134. Each handle 134 comprises the at least one vent 132, under handle 134. Footwear vending system 100 may further comprise breathable cover 180; wherein 180 may comprise horizontally-stacked sock pockets 182. The at least one footwear item 170 as discussed in the present disclosure comprises shoes 190 and/or boots 192, but is not intended to be limited as such; other footwear may be used such as slippers, thongs, and the like.

Removable footwear drawers 130 are preferably transparent; wherein each of removable footwear drawers 130 comprise picture-label 136 indicating which particular footwear item(s) 170 are stored therein.

Footwear vending system 100 may further comprise display screen 144; wherein display screen 144 displays footwear item(s) 170 in relation to relative placement within housing 120. Cpu 140 is able to be searched via an inputter 146 using boolean logic (entry of search key strings of words). Appropriate necessary software is included with purchase of the present invention. Inputter 146 may comprise a touchscreen; a keyboard or the like. Any suitable inputting means may be used including voice or text to carry out the desired operation of the present device. Footwear vending system 100 in preferred embodiments may further comprise illuminator means 148 to indicated where a selected footwear item 170 is located in relation to housing 120; illuminator means 148 is able to be activated to an on-condition on a corresponding removable footwear drawer 130 storing the selected at least one footwear item 170.

Vend-A-Shu system 100 may be sold as a kit comprising the following parts: at least one footwear vending assembly 110, breathable cover 180, cpu 140, modem 150, camera 160, and a set of user-instructions. The kit has instructions such that functional relationships are detailed in relation to the structure of the invention (such that the invention can be used, maintained, or the like in a preferred manner). Vend-A-Shu system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
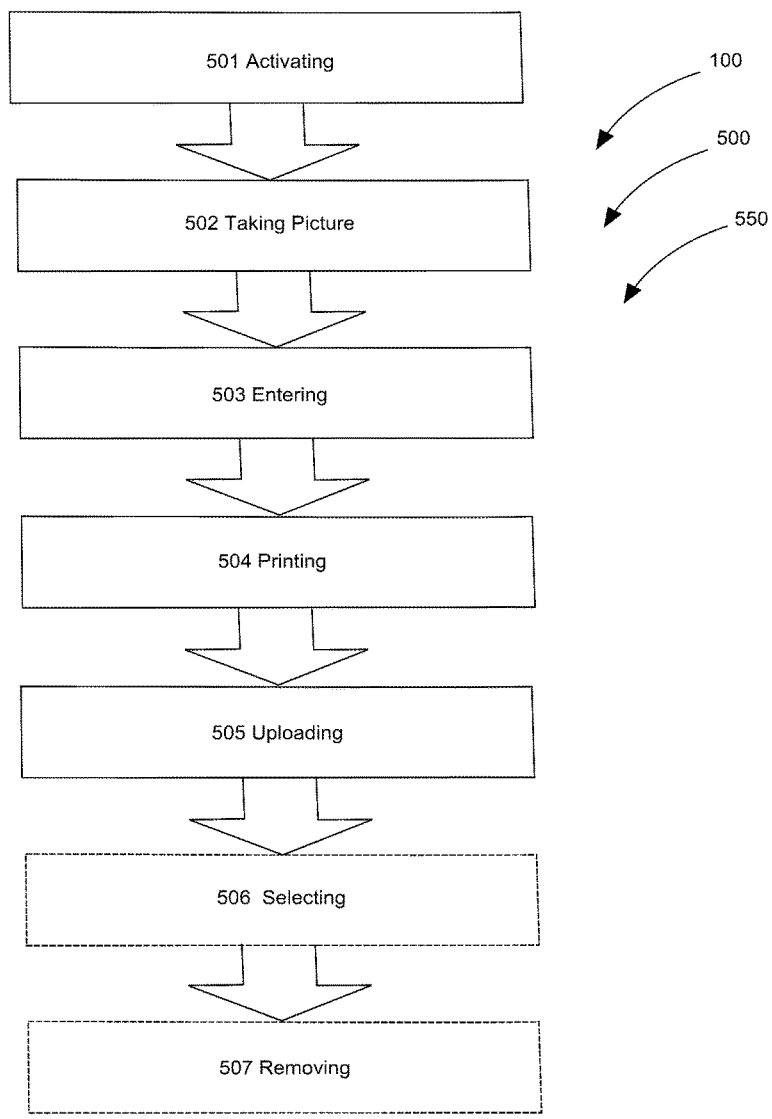
FIG. 5 is a flowchart illustrating a method of use for the Vend-A-Shu system according to an embodiment of the present invention of FIGS. 1-4.

Referring now to FIG. 5, a flowchart 550 illustrating a method of use 500 for footwear vending system 100 according to an embodiment of the present invention of FIGS. 1-4.

A method of using (method of use 500) footwear vending system 100 comprises the steps of: step one 501 activating cpu 140 of footwear vending system 100, step two 502 taking at least one picture of at least one footwear item 170, step three 503 entering a description via searchable keywords associating a particular footwear item 170 and the at least one picture to a corresponding removable footwear drawers, step four 504 printing picture-label 136 and installing it on selected removable footwear drawer 130, and step five 505 uploading the description(s) and the at least one picture to the internet for remote access. The method 500 may further comprise the steps of step six 506 selecting a desired at least one footwear item 170, as viewed, and step seven 507 removing selected at least one footwear item 170 for wear.

It should be noted that steps 506-507 are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A footwear vending system comprising:
   a footwear vending assembly comprising;
      a housing having;
         a shell having;
            an outer surface; and
            an inner volume with a plurality of receiver slots;
               wherein each receiver slot includes an illuminator attached therein; and
         a plurality of removable footwear drawers;
   a cpu;
   a modem;
   a camera;
   a photo studio software;
      wherein said photo studio software is adapted to function in conjunction with said cpu and said camera to take a digital picture of chosen footwear;
      wherein said photo studio software is adapted to produce a picture label of said chosen footwear to display upon an end portion of a respective said removable footwear drawer to thereby face outwardly and be viewed by a user; and
      wherein said user may assign a descriptive value to each said picture label and thereby to each of said chosen footwear and input this information into said cpu; and
   a display screen;
      wherein said display screen is adapted to display footwear items in relation to relative placement within receiver slots of said housing; and
      wherein each said illuminator is adapted to indicate where a selected one of said footwear items is located in relation to said housing by activating each said illuminator within the appropriate said removable footwear drawer that is storing said selected one of said footwear items;
   wherein said footwear vending system comprises said footwear vending assembly, said cpu, said modem, and said camera in functional combination;
   wherein said footwear vending assembly comprises said housing having said shell and said plurality of removable footwear drawers;
   wherein each of said plurality of removable footwear drawers is able to be removably received by each corresponding receiver slot of said plurality of receiver slots;
   wherein said shell of said housing is defined by said outer surface and said inner volume, said inner volume divided into said plurality of receiver slots;
   wherein said cpu is in communication with said modem, such that pictures taken of said at least one footwear item, via said camera, are able to be uploaded to an internet for remote access; and
   wherein said cpu stores and relays information related to said at least one footwear item stored in each of said removable footwear drawers such that a user is able to view via a display, said at least one footwear item(s) such that said user is able to expediently locate a desired said at least one footwear item to accessorize an outfit for wear.

2. The footwear vending system of claim 1 wherein said removable footwear drawers each comprise at least one vent.

3. The footwear vending system of claim 2 wherein said removable footwear drawers each comprise a handle.

4. The footwear vending system of claim 3 wherein each said handle comprises said at least one vent, under said handle.

5. The footwear vending system of claim 4 further comprising a breathable cover.

6. The footwear vending system of claim 5 wherein said breathable cover comprises horizontally-stacked sock pockets.

7. The footwear vending system of claim 1 wherein said at least one footwear item comprises shoes.

8. The footwear vending system of claim 1 wherein said at least one footwear item comprises boots.

9. The footwear vending system of claim 7 wherein said removable footwear drawers are transparent.

10. The footwear vending system of claim 9 wherein each of said removable footwear drawers comprise a picture-label indicating which particular said at least one footwear item is stored therein.

11. The footwear vending system of claim 1 wherein said cpu is able to be searched via an inputter using boolean logic.

12. The footwear vending system of claim 11 wherein said inputter comprises a touchscreen.

13. The footwear vending system of claim 11 wherein said inputter comprises a keyboard.

\* \* \* \* \*